United States Patent [19]

Cearley et al.

[11] Patent Number: 5,243,631
[45] Date of Patent: Sep. 7, 1993

[54] CONTROL ROD SERVICING APPARATUS AND METHOD

[75] Inventors: James E. Cearley; James R. Punches, both of San Jose; John G. Erbes, Mountain View; Matthew G. Garbett, Los Altos, all of Calif.

[73] Assignee: General Electric Company, San Jose, Calif.

[21] Appl. No.: 932,175

[22] Filed: Aug. 19, 1992

[51] Int. Cl.$^5$ .............................................. G21C 19/00
[52] U.S. Cl. ..................................... 376/260; 29/723; 29/402.08
[58] Field of Search .......................... 376/260; 83/930; 29/723, 906, 402.08, 402.07, 402.06, 402.03

[56] References Cited

U.S. PATENT DOCUMENTS

| | | | |
|---|---|---|---|
| 4,400,346 | 8/1983 | Aisaka et al. | 376/327 |
| 4,462,957 | 7/1984 | Fukui et al. | 376/327 |

Primary Examiner—Daniel D. Wasil
Attorney, Agent, or Firm—J. S. Beulick

[57] ABSTRACT

An apparatus and method are provided for servicing an irradiated nuclear control rod underwater in a reactor building servicing pool. A turntable containing a plurality of spaced apart tools is positioned adjacent to the control rod. A first tool aligns the turntable relative to the radioactive roller mounted to the control rod by a radioactive pin therethrough. The turntable is indexable to position a second tool adjacent to the radioactive roller and pin, with the second tool being effective for freeing the radioactive pin from the control rod. The turntable is indexable for positioning a third tool adjacent to the radioactive roller and pin for removing the radioactive pin and the roller from the control rod. In further embodiments of the invention the turntable is further indexable for positioning a fourth tool adjacent to the control rod for reaming the pin aperture through which the radioactive pin was mounted. The turntable further includes a fifth tool which is indexable into position adjacent to the control rod for inserting a replacement roller and replacement pin therein. The replacement pin is secured to the control rod by a sixth tool supported on the turntable which is also indexable into position.

18 Claims, 18 Drawing Sheets

FIG. 3
FIG. 2
FIG. 4
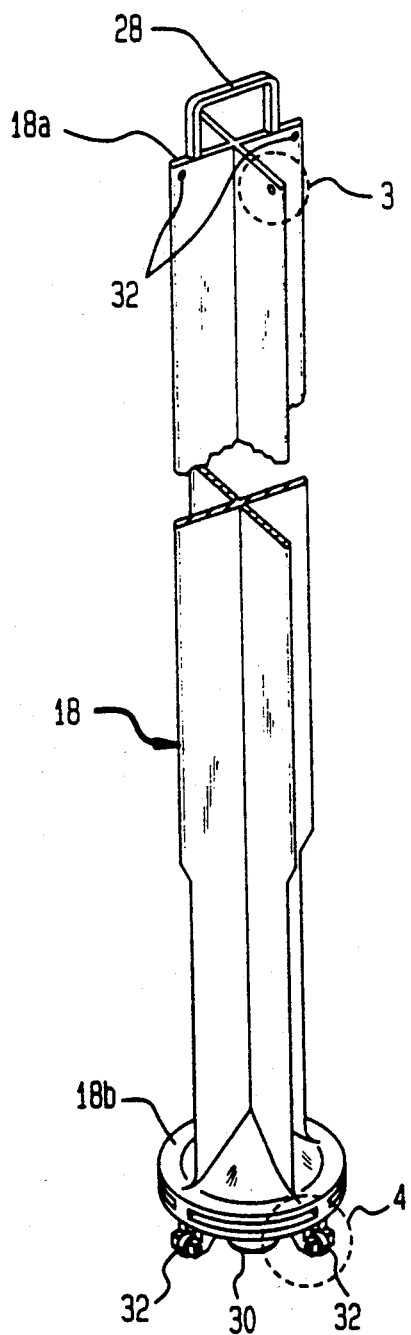
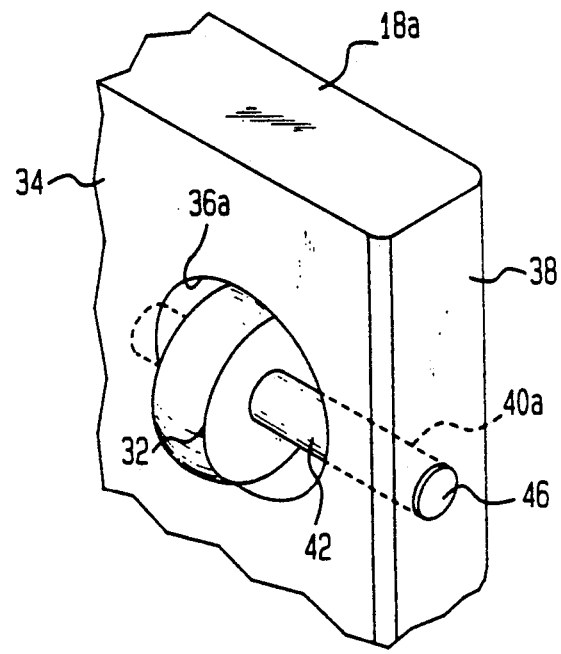
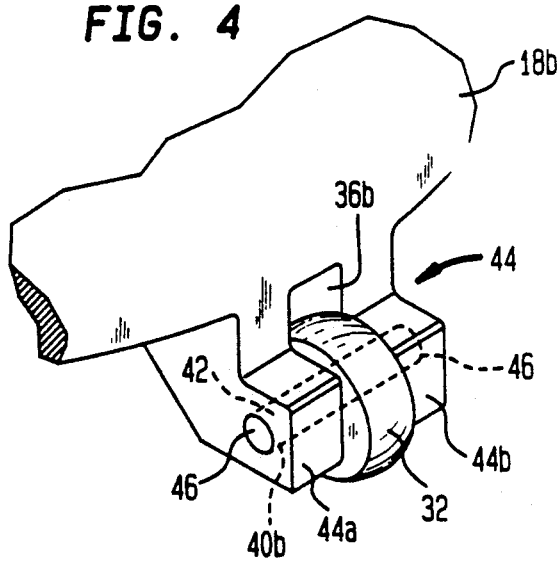

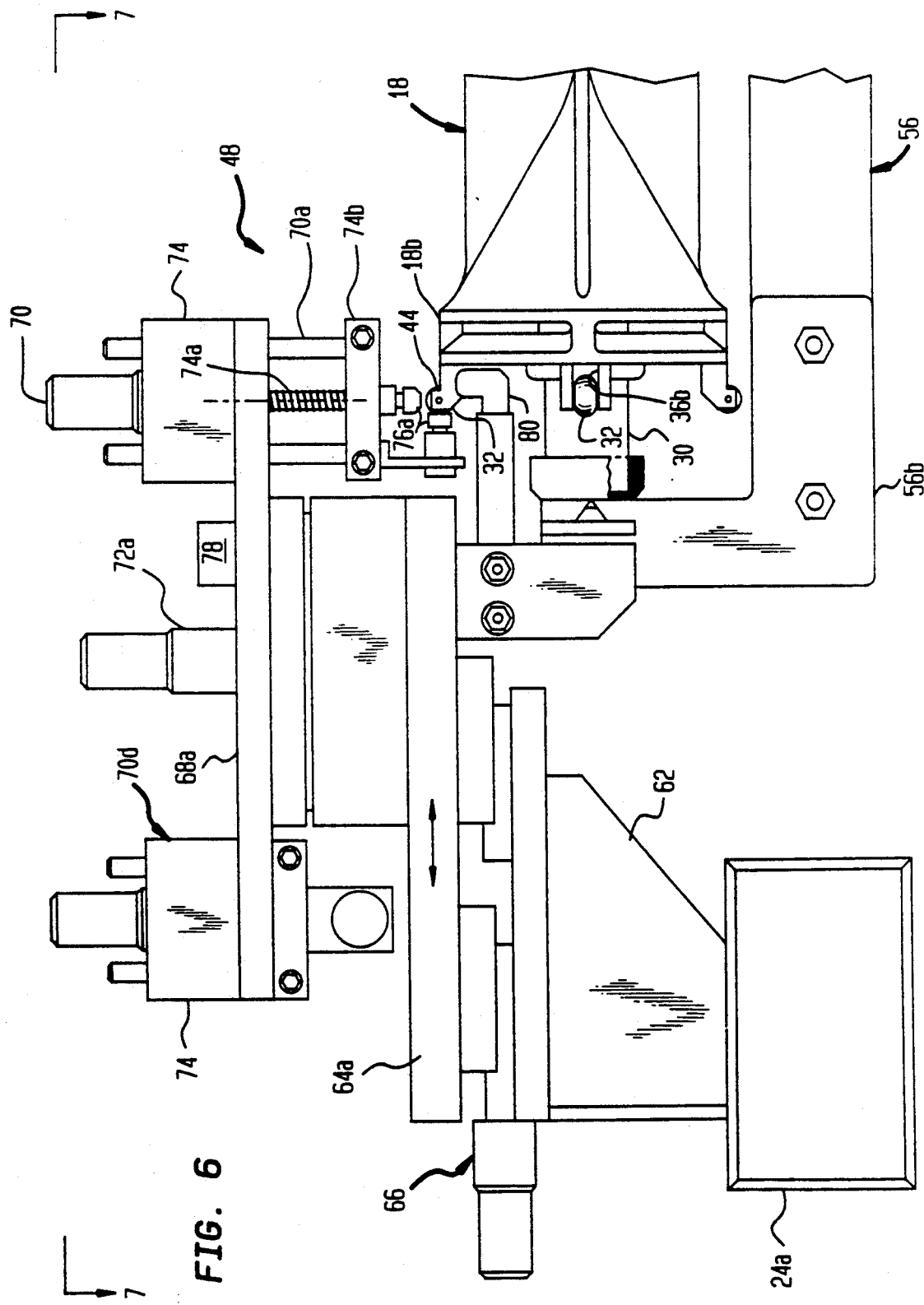

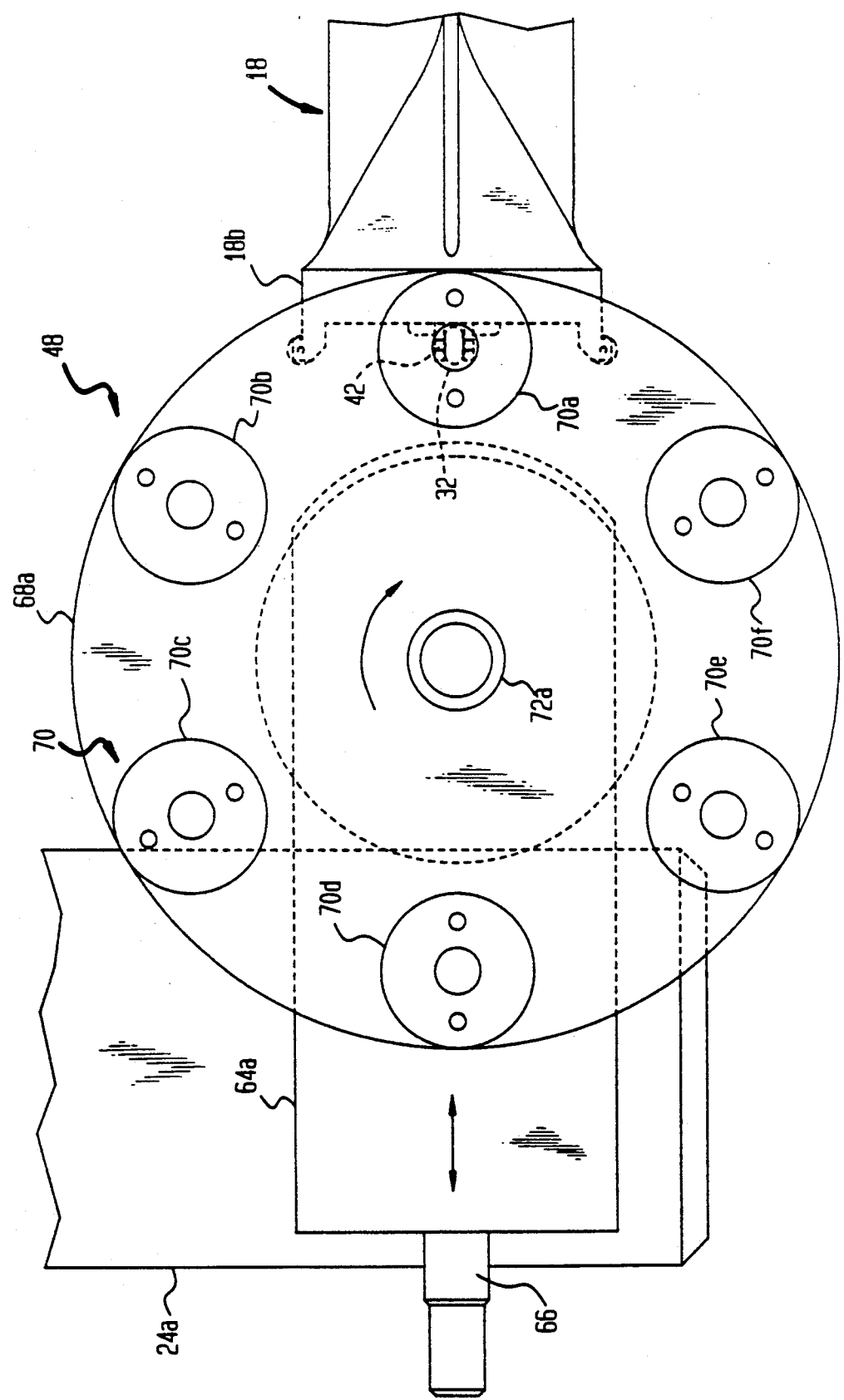

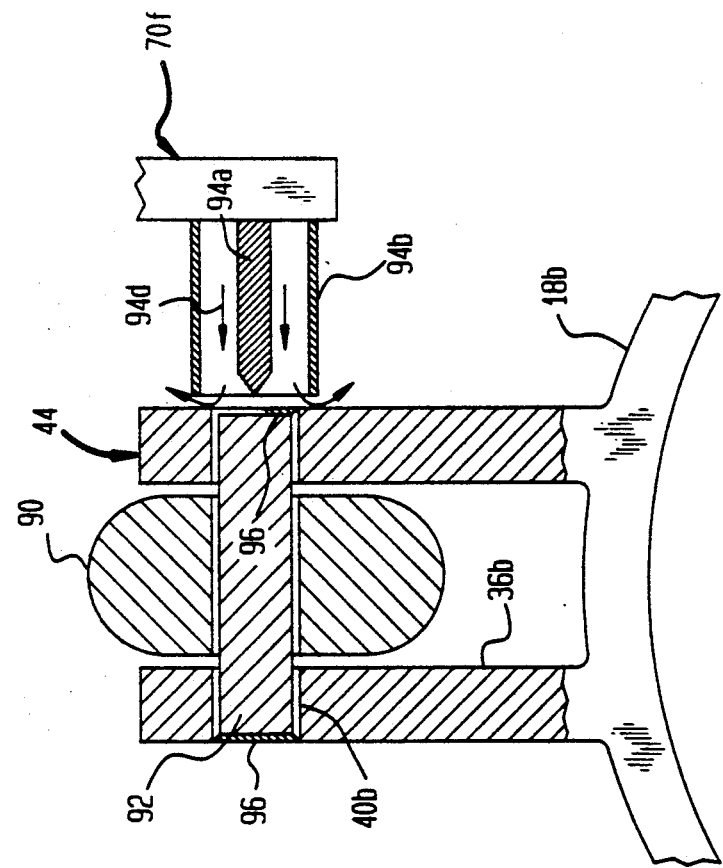
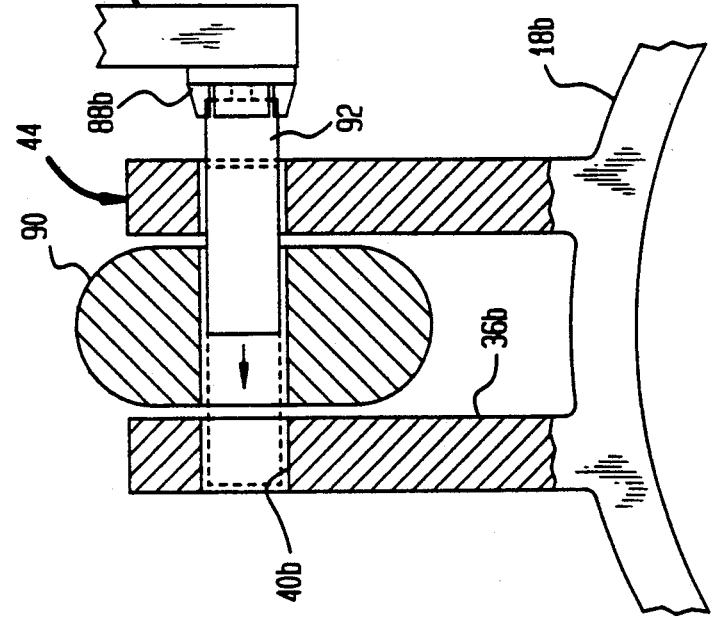

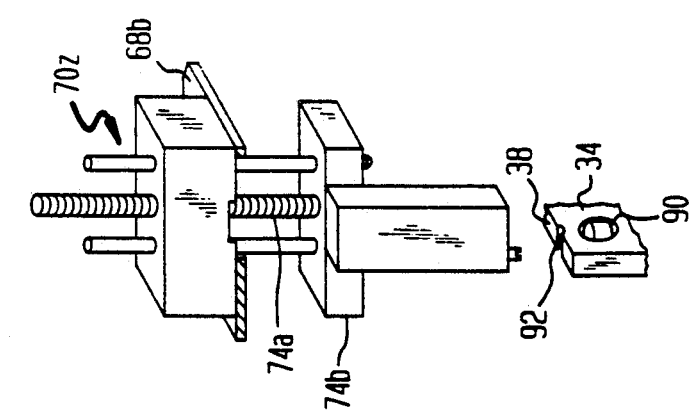
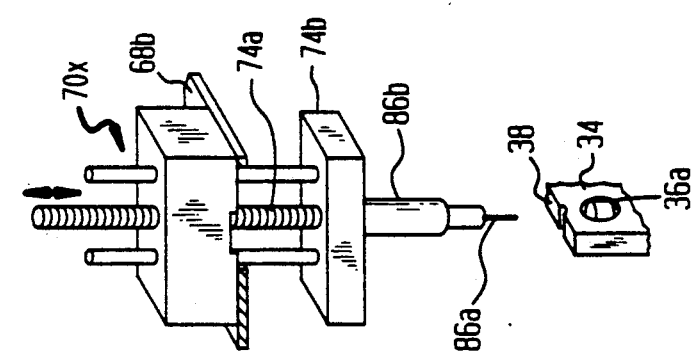
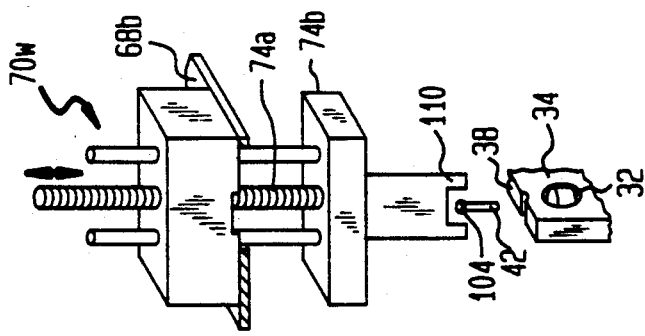
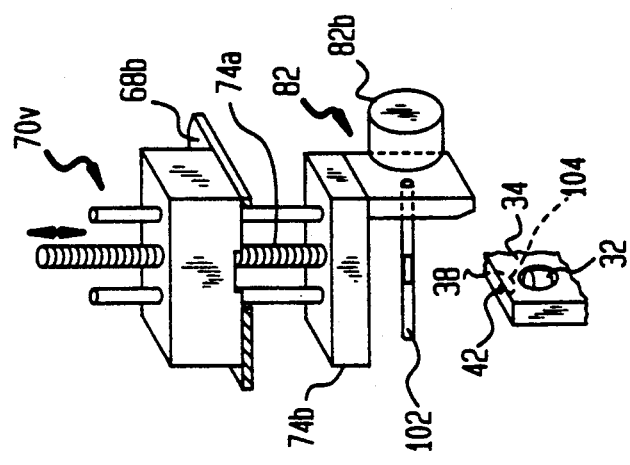

CONTROL ROD SERVICING APPARATUS AND METHOD

The present invention relates generally to nuclear reactors, and, more specifically, to an apparatus and method for servicing control rods therein having radioactive rollers and pins.

BACKGROUND OF THE INVENTION

In a nuclear reactor such as a boiling water reactor (BWR), a plurality of control rods are selectively inserted into and withdrawn from a reactor core containing a plurality of nuclear fuel bundles therein. The fuel bundles are disposed in flow or fuel channels which are spaced apart from each other to define passages through which the control rods may be translated upwardly or downwardly. Exemplary control rods have cruciform cross sections which are disposed in complementary shaped passages between adjacent fuel bundles. As the control rods are translated upwardly and downwardly, they intermittently slide against the fuel channels.

In order to reduce abrasion between the sliding control rods and the fuel channels, the control rods typically include pin mounted rollers which provide the sole points of contact between the control rods and the fuel channels as the control rods are translated. In order to reduce wear of the rollers and pins themselves, they are typically formed from conventional abrasion resistant materials containing cobalt. However, it has been determined through operation of the reactors, that the neutron flux within the reactor core irradiates the rollers and pins causing them to become highly radioactive. As the rollers and pins wear and corrode during operation, the particles released thereby remain radioactive and are circulated along with the reactor water channeled through the core. These radioactive particles increase the radiation levels of plant equipment through which the water is circulated.

Accordingly, the cobalt content of rollers and pins is being reduced or eliminated in newer reactors to reduce or eliminate the increased radiation due to the radioactive cobalt particles.

However, cobalt containing rollers and pins are presently in service in nuclear reactors, and the replacement of the entire control rod including the cobalt containing rollers and pins joined thereto would appear to be impractical and costly.

OBJECTS OF THE INVENTION

Accordingly, one object of the present invention is to provide a control rod servicing apparatus and method for removing radioactive cobalt containing rollers and pins from control rods.

Another object of the present invention is to provide an apparatus and method for removing the cobalt containing rollers and pins underwater in existing reactors.

Another object of the present invention is to provide an apparatus and method for replacing cobalt containing rollers and pins with non-cobalt containing rollers and pins.

SUMMARY OF THE INVENTION

An apparatus and method are provided for servicing an irradiated nuclear control rod underwater in a reactor building servicing pool. A turntable containing a plurality of spaced apart tools is positioned adjacent to the control rod. A first tool aligns the turntable relative to the radioactive roller mounted to the control rod by a radioactive pin therethrough. The turntable is indexable to position a second tool adjacent to the radioactive roller and pin, with the second tool being effective for freeing the radioactive pin from the control rod. The turntable is indexable for positioning a third tool adjacent to the radioactive roller and pin for removing the radioactive pin and the roller from the control rod. In further embodiments of the invention the turntable is further indexable for positioning a fourth tool adjacent to the control rod for reaming the pin aperture through which the radioactive pin was mounted. The turntable further includes a fifth tool which is indexable into position adjacent to the control rod for inserting a replacement roller and replacement pin therein. The replacement pin is secured to the control rod by a sixth tool supported on the turntable which is also indexable into position.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which:

FIG. 2 is a perspective view of an exemplary nuclear reactor control rod having pin mounted rollers at the top and bottom thereof.

FIG. 3 is an enlarged perspective view of one of the plate-mounted rollers at the top of the control rod illustrated in FIG. 2 within the circle labeled 3.

FIG. 4 is an enlarged perspective view of one of the clevis-mounted rollers at the bottom of the control rod illustrated in FIG. 2 within the circle labeled 4.

FIG. 6 is an elevation, side view of a first machine for removing and replacing the clevis-mounted rollers and pins at the bottom of the control rod illustrated in FIG. 1 shown with a first tool in position.

FIG. 7 is a top view of the first machine illustrated in FIG. 6 taken along line 7—7 showing six tools mounted on a turntable.

FIG. 20 is an enlarged elevational, partly sectional view of a portion of the fifth tool illustrated in FIG. 18 showing a replacement pin being inserted into the clevis.

FIG. 22 is an enlarged, elevation, partly sectional view of a portion of the sixth tool illustrated in FIG. 21 adjacent to the clevis.

FIG. 25 is an enlarged, schematic view of the second tool illustrated in FIG. 23.

FIG. 29 is an elevational, schematic view of the third tool illustrated in FIG. 23.

FIG. 31 is an elevational, schematic view of the fourth tool illustrated in FIG. 23 adjacent to the control rod plate.

FIG. 35 is an elevational, schematic view of the sixth tool joined to the turntable illustrated in FIG. 23 adjacent to the control rod plate.

DESCRIPTION OF THE PREFERRED EMBODIMENT(S)

Figure 1:
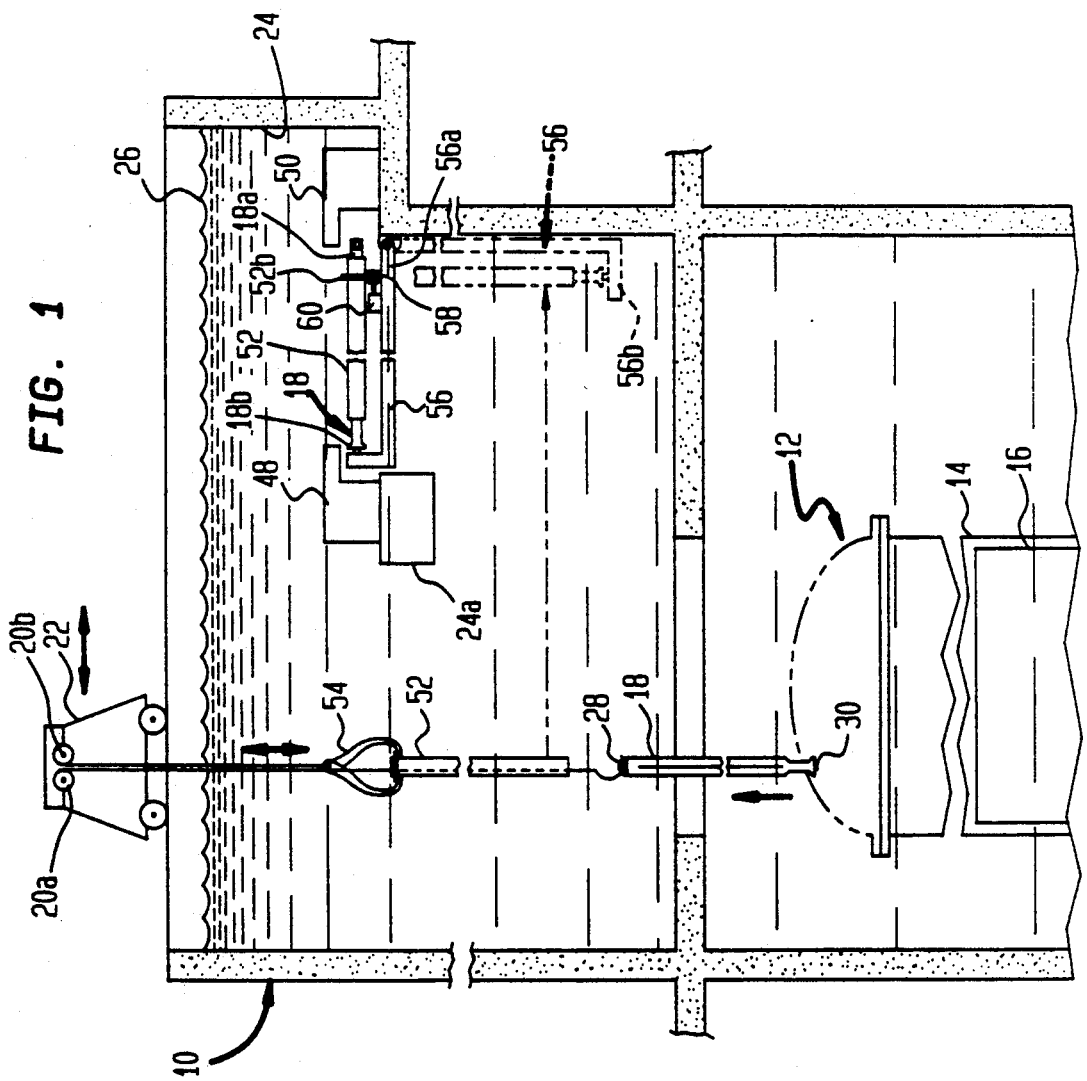
FIG. 1 is a schematic, elevation view of a portion of a reactor building including two machines in accordance with respective embodiments of the present invention disposed underwater for servicing a control rod.

Illustrated schematically in FIG. 1 is a portion of a reactor building 10 containing a conventional nuclear reactor such as, for example, a boiling water reactor (BWR) 12. The reactor 12 includes a conventional pressure vessel 14 containing a conventional nuclear reactor core 16 therein. The vessel 14 is illustrated with its upper head (shown in phantom) removed during a maintenance outage. The reactor 12 includes a plurality of conventional control rods 18, with an exemplary one shown being removed upwardly from the pressure vessel 14 by a conventional first hoist 20a carried on a conventional movable trolley or bridge 22. The reactor building 10 includes a conventional servicing pool 24 suitably filled with water 26 so that the control rods 28 are at all times maintained underwater during the servicing operation.

Illustrated in FIG. 2 is an exemplary one of the control rods 18 having a generally cruciform cross-section. The control rod 18 has a top end 18a to which is conventionally attached a handle 28. The control rod 18 also has a bottom end 18b in the conventional form of an annular velocity limiter from which extends a conventional coupling socket 30 which mates with a conventional control rod drive which is used during normal operation for conventionally inserting the control rod 18 into the reactor core 16 from the bottom of the pressure vessel 14 and for withdrawing the control rod 18 therefrom as desired.

During insertion and withdrawal of the control rod 18 during operation, the cruciform portions thereof intermittently slide against conventional flow or fuel channels (not shown) within the reactor core 16. In order to reduce sliding wear between the control rods 18 and the fuel channels during operation, each of the control rods 18 includes a plurality of conventional cobalt containing rollers 32 secured thereto, with four rollers 32 being shown at the top end 18a and four additional rollers 32 shown at the bottom end 18b.

The rollers 32 are illustrated in more particularity in FIGS. 3 and 4 in two different mounting arrangements. In FIG. 3, the control rod 18 includes a plate 34 which is a corner of one of the cruciform portions of the control rod 18 having a roller aperture 36a extending perpendicularly therethrough adjacent to a vertically extending edge 38. A pin aperture 40a shown in dashed line extends perpendicularly inwardly in from the edge 38 through a portion of the plate 34 and through the roller aperture 36 to form a blind receptacle for receiving a conventional cobalt containing, elongate mounting pin 42. The rollers 32 extend outwardly from each of the four plates 34 defining the cruciform upper end 18a of the control rod 18 for providing rolling points of contact therefor as it moves between adjacent fuel channels in the core 16 during operation for reducing wear therebetween.

FIG. 4 illustrates an alternate embodiment of mounting of the rollers 32 at the control rod bottom end 18b which includes a conventional U-shaped clevis 44 having a pair of spaced apart legs 44a, 44b defining therebetween another form of the roller aperture 36b for receiving the roller 32. A pin aperture 40b extends through both the legs 44a, 44b for receiving the mounting pin 42 to secure the roller 32 in the clevis 44. The mounting pins 42 of the two embodiments illustrated in FIGS. 3 and 4 are conventionally fixedly joined to the control rod 18 by conventional plug welds 46. In FIG. 3, the plug weld 46 joins the end of the pin 42 to the edge 38. And, in FIG. 4, the mounting pin 42 is joined to at least one of the legs 44a, 44b by the plug weld 46, and as shown, is welded at both ends of the pin 42 to the clevis 44.

Figure 5:
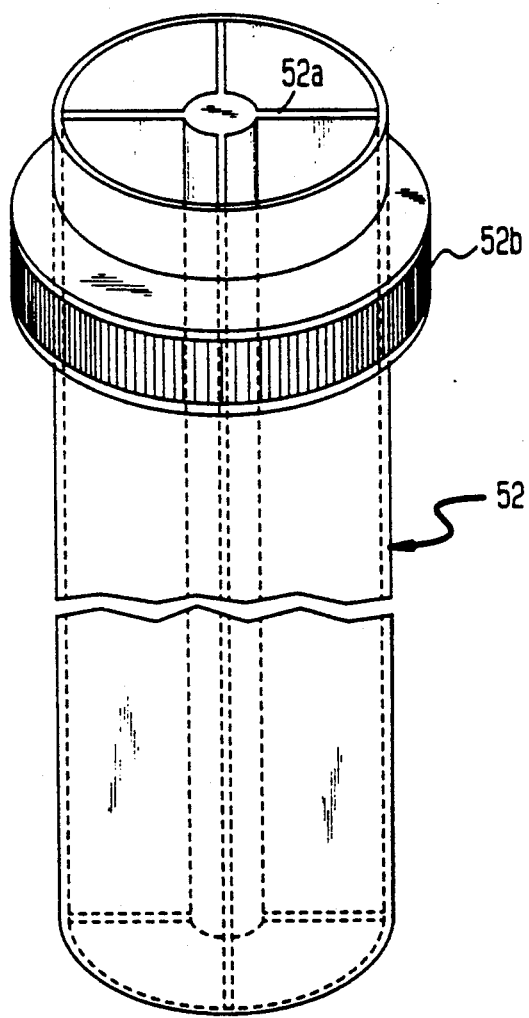
FIG. 5 is a schematic representation of a strongback tube used for supporting the control rod illustrated in FIG. 1.

During normal operation of the control rod 18 in the reactor core 16, the neutron flux therein irradiates the cobalt containing rollers 32 and pins 42 and thereby causes them to become radioactive. In accordance with the present invention, two apparatuses or machines 48 and 50 shown schematically in FIG. 1 underwater in the servicing pool 24 are provided for removing the radioactive rollers 32 and pins 42 from the control rods 18. In order to position each of the control rods 18 adjacent to the machines 48, 50, a strongback tube 52 is conventionally supported in the pool 24 by a conventional grapple 54 joined to a conventional second hoist 20b carried by the trolley 22. The cable of the second hoist 20b initially extends downwardly through the center of the strongback tube 52, with its hook capturing the handle 28 of a control rod 18 for lifting the control rod 18 vertically inside the strongback tube 52. The tube 52 is illustrated in more particularity in FIG. 5 and includes a cruciform channel 52a extending longitudinally therethrough from the top end of the tube 52 to the bottom end of the tube 52 which is complementary in configuration to the cruciform control rod 18 for securely retaining therein the control rod 18. The strongback tube 52 provides structural reinforcement of the control rod 18 to prevent damage thereto during the servicing operation and for providing a convenient structure for positioning the control rod 18. For this purpose, the tube 52 preferably includes a conventional ring gear 52b fixedly secured to its upper end for selectively rotating the tube 52 and the control rod 18 therein.

More specifically, and referring again to FIG. 1, once the control rod 18 is lifted in position inside the strongback tube 52, the tube 52 is moved by the trolley 22 underwater to an upender support rail 56 pivotally joined at its upper end 56a to the pool 24. A bottom end 56b of the rail 56 is L-shaped and includes a suitable dog onto which the control rod coupling socket 30 is placed for securely mounting the control rod 18 and the strongback tube 52 to the support rail 56. As shown in phantom line in FIG. 1, the support rail 56 is initially in a vertical orientation and is then conventionally pivoted upwardly by one of the hoists 20a, 20b, for example, into the horizontal position shown in solid line. The control rod bottom end 18b is then positioned adjacent to the first machine 48, and the control rod top end 18a is positioned adjacent to the second machine 50. The ring gear 52b of the strong back tube 52 is conventionally supported by a pinion gear 58 operatively joined to a conventional electrical motor 60 which can selectively rotate the pinion gear 58 and, in turn, the ring gear 52b for rotating the strongback tube 52 and, in turn, rotating the control rod 18 for positioning the several rollers 32 relative to the machines 48, 50 for the removal thereof. Since the rollers 32 illustrated in FIGS. 3 and 4 are mounted differently at the top and bottom ends 18a, 18b of the control rods 18, the machines 48, 50 are suitably tailored for removing the rollers 32 but operate similarly.

More specifically, and referring to FIGS. 6 and 7, the first machine 48 is illustrated in more detail. The first machine 48 includes a frame 62 conventionally joined to the pool 24, for example to a ledge 24a extending from one of its walls. A first base plate or carriage 64a is conventionally mounted to the frame 62 for sliding movement relative thereto. More specifically, conventional means 66 for translating the carriage towards the clevis 44 generally parallel to the longitudinal axis of the control rod 18 are provided for axially sliding the carriage 64a. The translating means 66 is in the exemplary form of an electrical motor selectively rotating a drive screw which selectively translates the carriage 64a either toward the clevis 44 or away from the clevis 44 as desired. A conventional first turntable 68a is rotatably joined to the first carriage 64a and includes a plurality of circumferentially spaced apart tools indicated collectively at 70 supported thereon. Conventional first means 72a in the form of an electric motor are provided for selectively rotating the turntable 68a to position or index a first one 70a of the tools 70 adjacent to one of the radioactive rollers 32 mounted in the roller aperture 36b.

Each of the tools 70 includes a conventional drive motor 74 mounted to the top of the turntable 68a having a drive screw 74a extending downwardly therethrough. The drive screw 74 is conventionally joined to a tool support 74b which is selectively retracted upwardly away from the roller 32 and selectively translated downwardly adjacent to the roller 32. The several tools 70 are substantially identical except for the tool portions mounted to the tool supports 74b and extending downwardly therefrom.

More specifically, the first tool 70a illustrated in FIG. 6 is an aligner tool having two location probes 76a which are used for aligning the turntable 68a, and in turn the tools 70 thereon, relative to the radioactive roller 32. The translating means 65 are effective for positioning the carriage 64a, which supports the turntable 68a and in turn the probes 76, adjacent to the control rod 18, and, in particular, adjacent to a respective roller 32.

Accordingly, a method in accordance with the present invention includes positioning adjacent to the control rod 18 the carriage 64a containing the tools 70 supported on the turntable 68a, and then rotating the turntable 68a to index the first tool 70a adjacent to the radioactive roller 32. The method then includes the step of aligning the turntable 68a relative to the radioactive roller 32 using the location probes 76a of the first tool 70a. The coordinates of the roller 32 may be stored in a conventional computer 78 which controls operation of the machine 48. Once the location of the roller 32 is accurately determined, a conventional pneumatic clamp 80 may then grip the clevis 44 to secure the clevis 44 in space for further operations.

As illustrated in FIG. 7, the rotating means 72a are effective for rotating the turntable 68a for successively indexing adjacent to the radioactive roller 32, and pin 42 extending therethrough, second, third, fourth, fifth, and sixth tools 70b, 70c, 70d, 70e, and 70f, respectively, with the preceding tool being retracted and moved out of the way. Each of the tools 70 provides a special operation, such as the first tool 70a providing initial alignment of the turntable 68a and all of the tools 70 thereon relative to the roller 32 and the pin 42.

Figure 8:
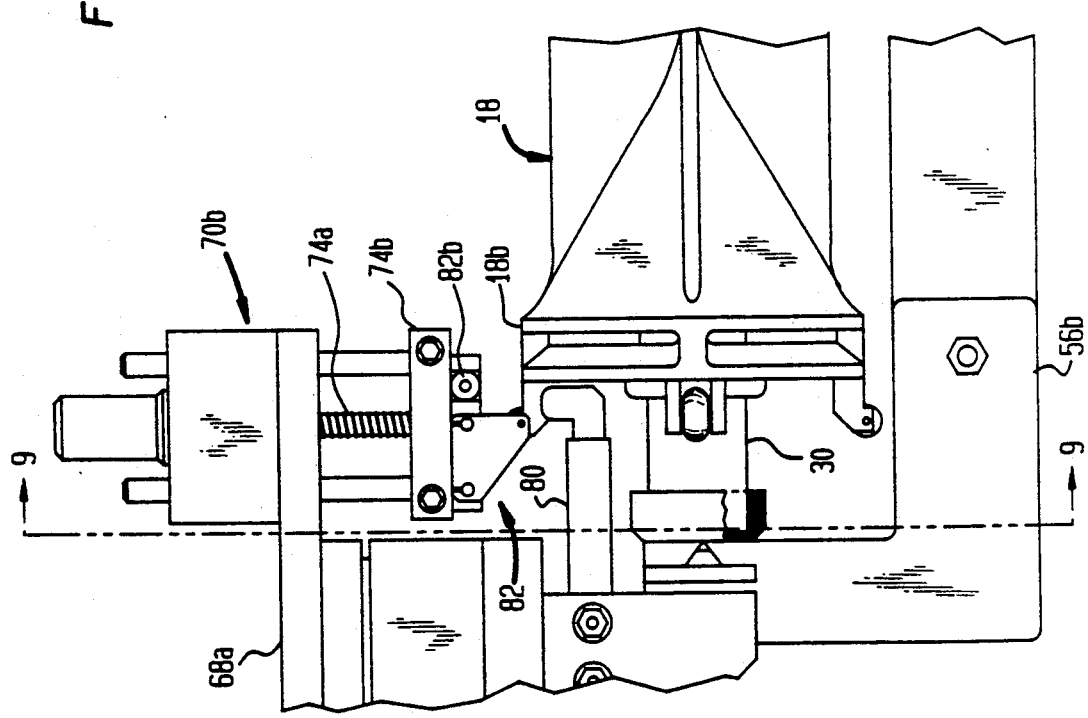
FIG. 8 is an elevation, side view of the second tool illustrated in FIG. 7 in position adjacent to one of the rollers.
Figure 9:
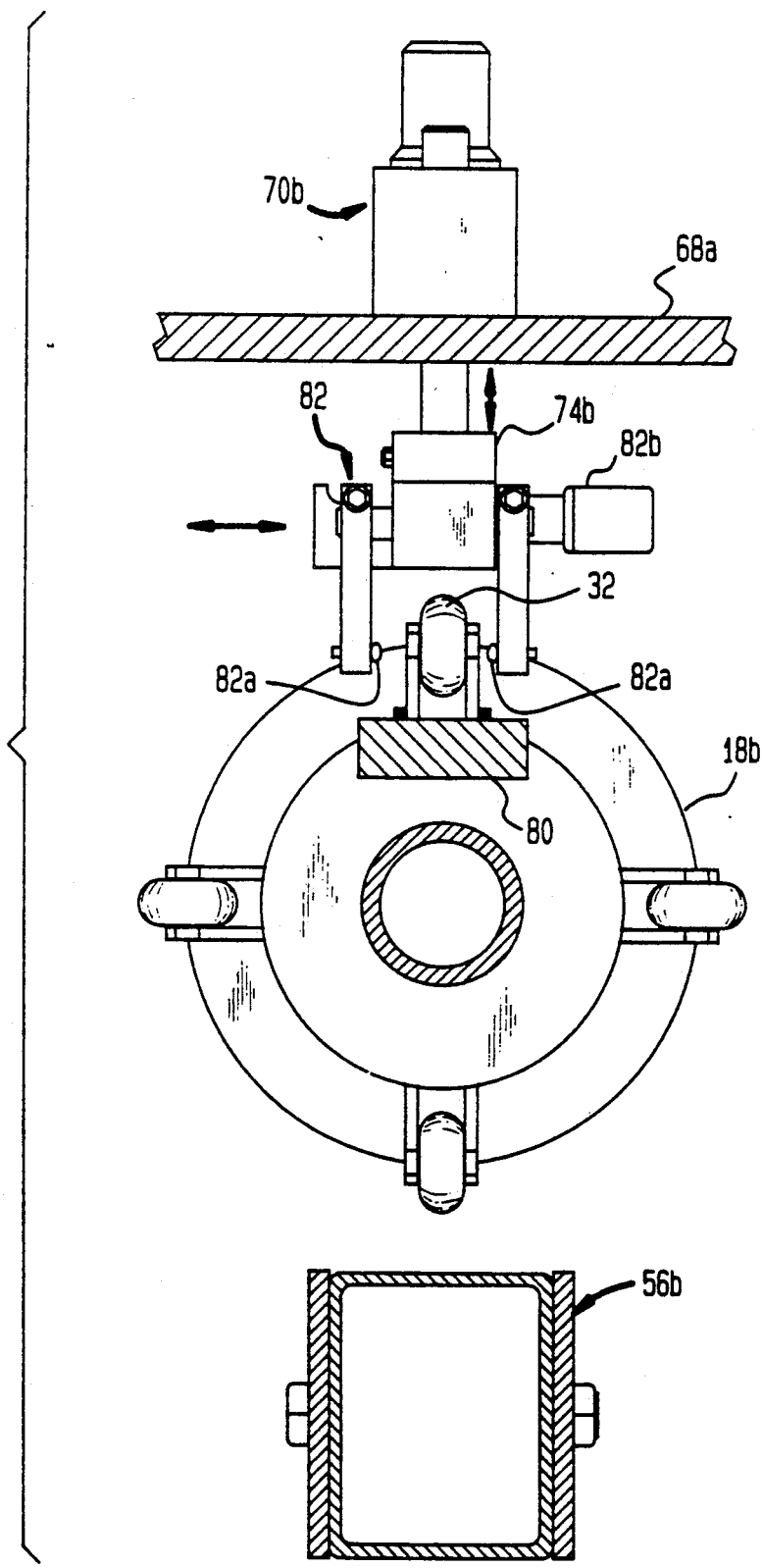
FIG. 9 is an elevation, partly sectional transverse view of the second tool illustrated in FIG. 8 taken along line 9—9.
Figure 10:
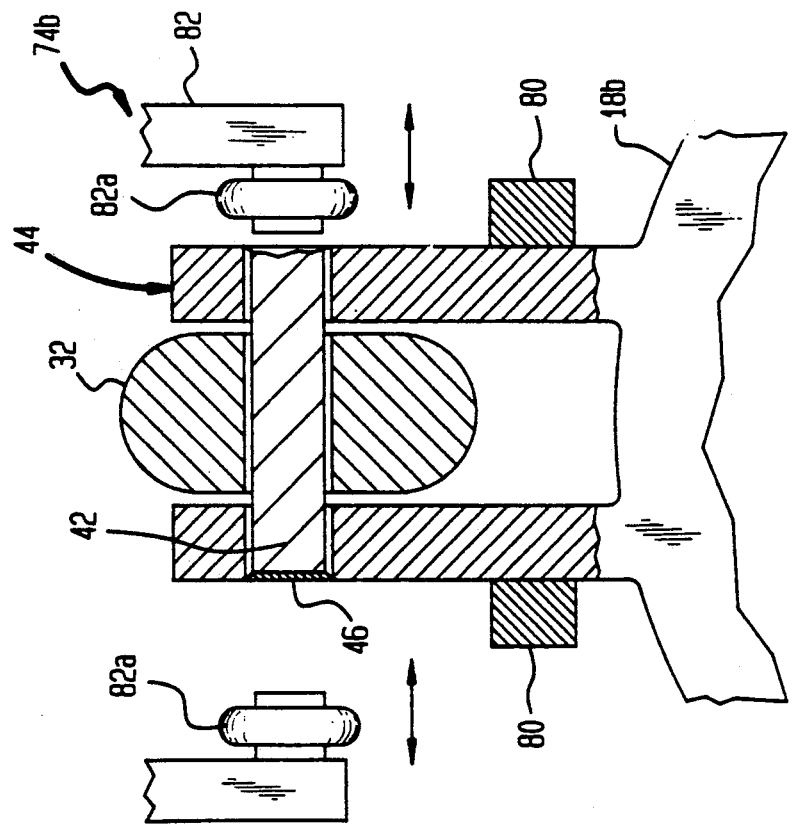
FIG. 10 is an enlarged, elevation, partly sectional view of a portion of the second tool illustrated in FIG. 9 adjacent to the clevis mounted roller and pin.

FIGS. 8 and 9 illustrate the second tool 70b disposed in position adjacent to the roller 32 and the pin 42, and FIG. 10 illustrates the operation of freeing the pin 42 from the clevis 44 of the control rod 18 using the second tool 70b. More specifically, joined to the tool support 74b of the second tool 70b are means 82 in the exemplary form of a conventional electrical discharge machine (EDM) having at least one, and in this exemplary embodiment two conventional electrodes 82a. The electrodes 82a are suitably mounted to the tool support 74b and are selectively translatable by a conventional drive motor 82b alternatively adjacent to the welds 46 on opposite ends of the pin 42. As shown in FIG. 10, the right hand electrode 82a is positioned adjacent to the right end of the pin 42 for electrically eroding away the weld 46 for separating the weld 46 from the clevis 44 for freeing the pin 42 from the control rod 18 at the clevis 44 by removing the weld 46 between the pin 42 and the clevis 44. The drive motor 82b then moves both the left hand and right hand electrodes 82a to the right, withdrawing the right hand electrode 82a and positioning the left hand electrode 82a adjacent to the weld 46 at the left end of the pin 42, and then the process is repeated to remove also that weld 46 to entirely free the pin 42 from the clevis 44. The EDM 82 is then retracted upwardly away from the roller 32 by the drive screw 74a for the next operation. Although electrical discharge machining is used in the preferred embodiment for removing the welds 46, any suitable alternate process may be used such as grinding, milling, or drilling, for example.

Figure 11:
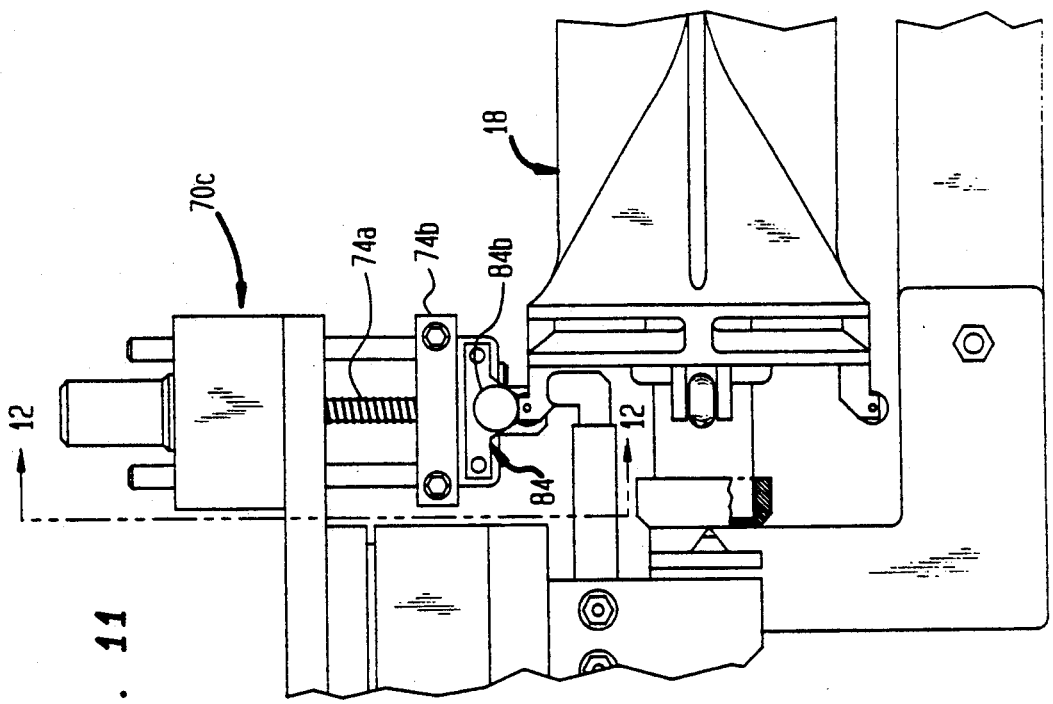
FIG. 11 is an elevation, side view of the third tool illustrated in FIG. 7 in position adjacent to the clevis mounted roller.
Figure 13:
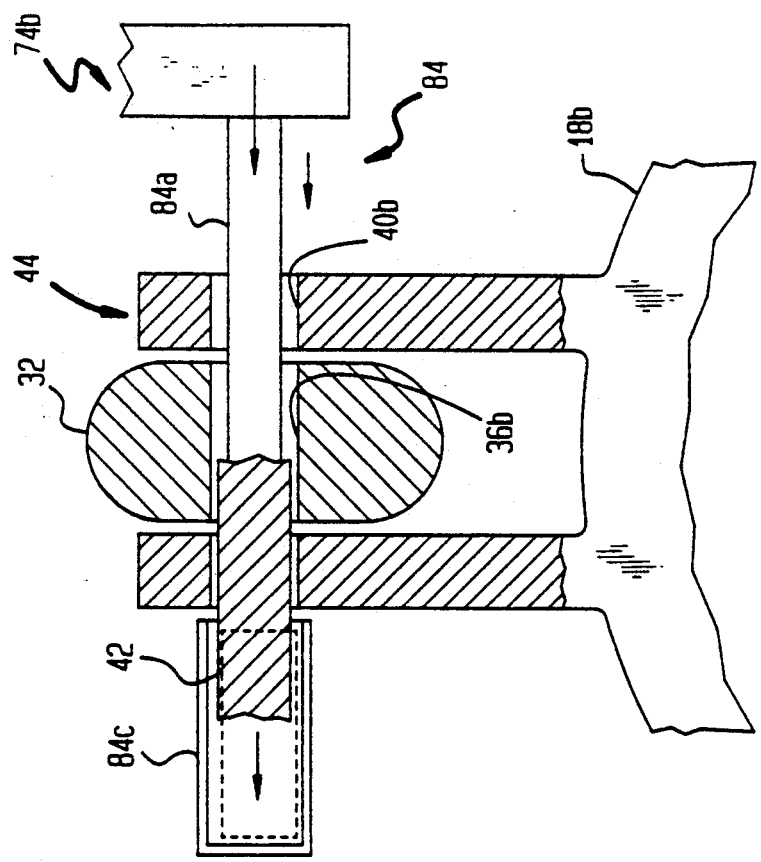
FIG. 13 is an enlarged, elevation, partly sectional view of a portion of the third tool illustrated in FIG. 12 adjacent to the clevis mounted roller.
Figure 12:
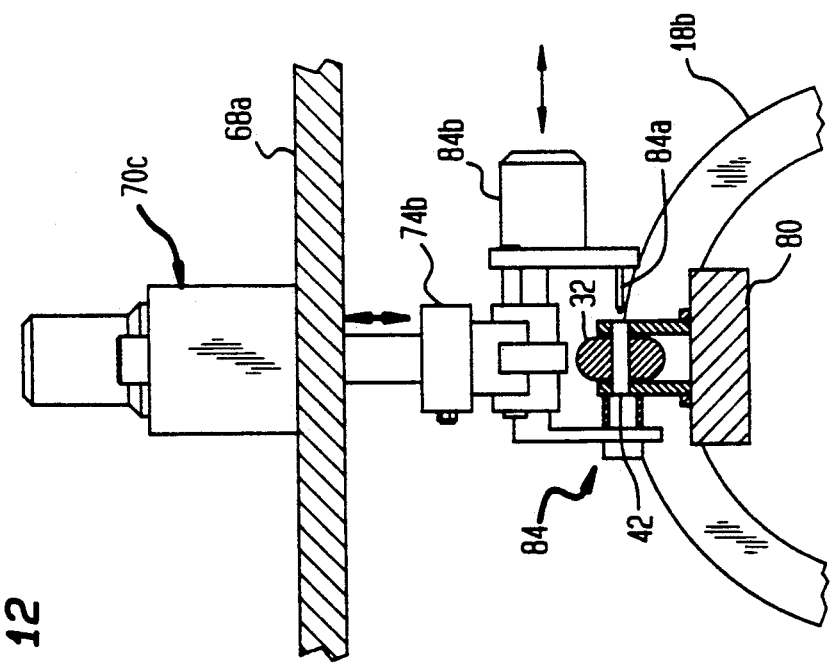
FIG. 12 is an elevation, partly transverse sectional view of the third tool illustrated in FIG. 11 taken along line 12—12.
Figure 14:
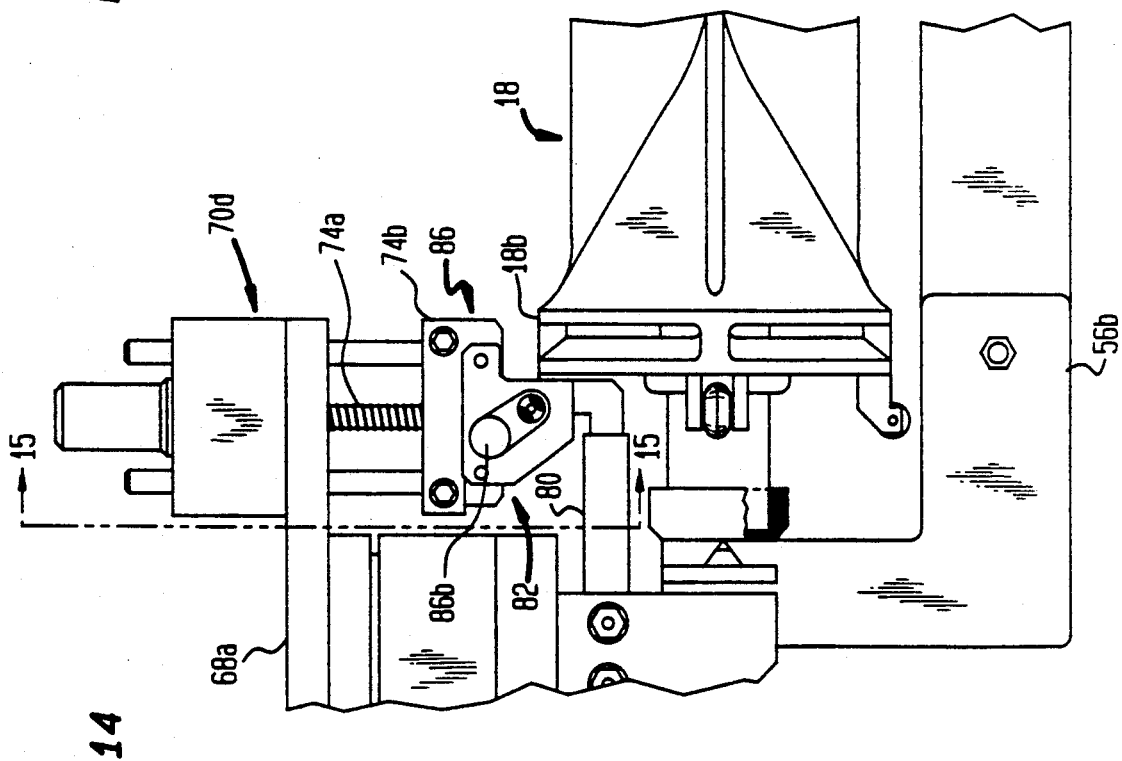
FIG. 14 is an elevation, side view of the fourth tool shown in FIG. 7 in position adjacent to the clevis mounted roller.

The method proceeds by rotating the turntable 68a illustrated in FIG. 7 to index the third tool 70c adjacent to the roller 32 and pin 42. The third tool 70c is shown in position adjacent to the roller 32 and pin 42 in FIGS. 11-13. The third tool 70c is an ejector tool including means 84 for removing the radioactive pin 42 and the roller 32 from the clevis 44 of the control rod 18. The removing means 84 include a ram pin 84a operatively joined to a conventional drive motor 84b which is joined to the tool support 74b, with the drive motor 84b being effective for translating the ram pin 84a against one end of the radioactive pin 42 as illustrated in FIG. 13 to push the pin 42 through the pin and roller apertures 40b, 36b for removal from the clevis 44. As shown in FIG. 13, the removing means 84 may also include a suitable pin receptacle 84c into which the ejected radioactive pin 42 may be collected for removal from the machine 48. Another receptacle (not shown) may also be provided for catching the radioactive roller 32 as it drops from between the clevis 44 upon removal of the pin 42. The drive screw 74a then retracts the tool support 74b and the removing means 84 upwardly away from the clevis 44 so that the turntable 68a illustrated in FIG. 7 may again be indexed by the rotating means 72a for indexing into position the fourth tool 70d shown in FIGS. 14-16 adjacent to the pin aperture 40b.

Figure 15:
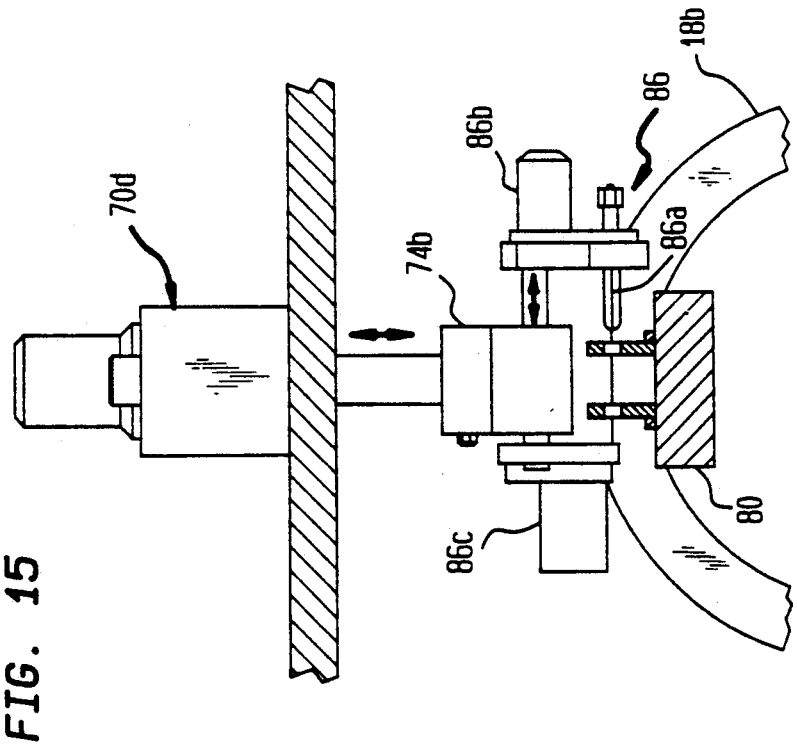
FIG. 15 is an elevational, partly sectional transverse view of a portion of the fourth tool illustrated in FIG. 14 taken along line 15—15.
Figure 16:
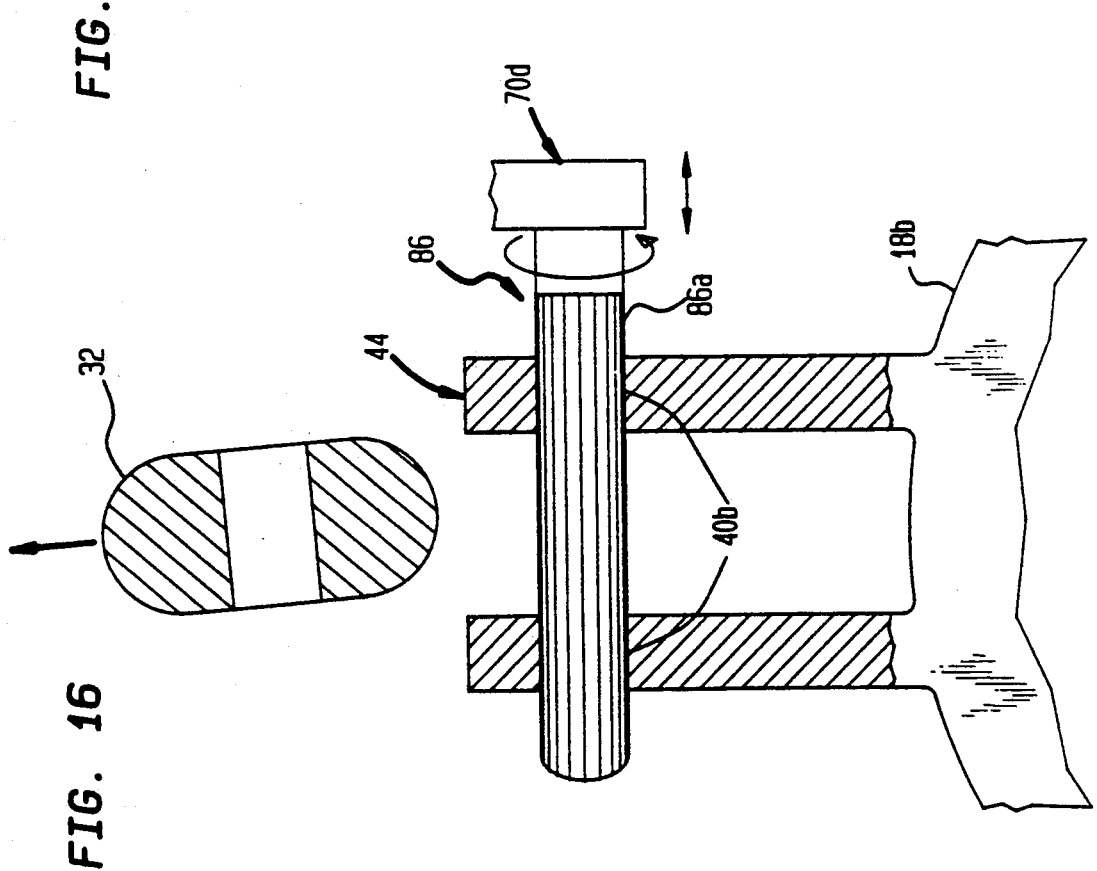
FIG. 16 is an enlarged, elevation, partly sectional view of a portion of the fourth tool illustrated in FIG. 15 adjacent to the clevis.

The fourth tool 70d includes cleaning or reaming means 86 in the conventional form of a reamer 86a for reaming the pin aperture 40b as required to clean up any buildup of corrosion or debris therein. The reaming means 86 also include a conventional first drive motor 86b operatively joined to the reamer 86a for selectively rotating the reamer 86a. A second drive motor 86c as illustrated in FIG. 15 is operatively joined to the reamer 86a and the first drive motor 86b for selectively translating the reamer 86a through the pin apertures 40b as the reamer 86a is rotated by the first drive motor 86b. Once the pin aperture 40b is suitably cleaned, the reamer 86a may be suitably retracted, and then the entire reaming means 86 may be retracted upwardly by the drive screw 74a so that the turntable illustrated in FIG. 7 may be again rotated for indexing the fifth tool 70e in turn adjacent to the roller aperture 36b of the clevis 44 as shown in FIGS. 17-20.

Figure 17:
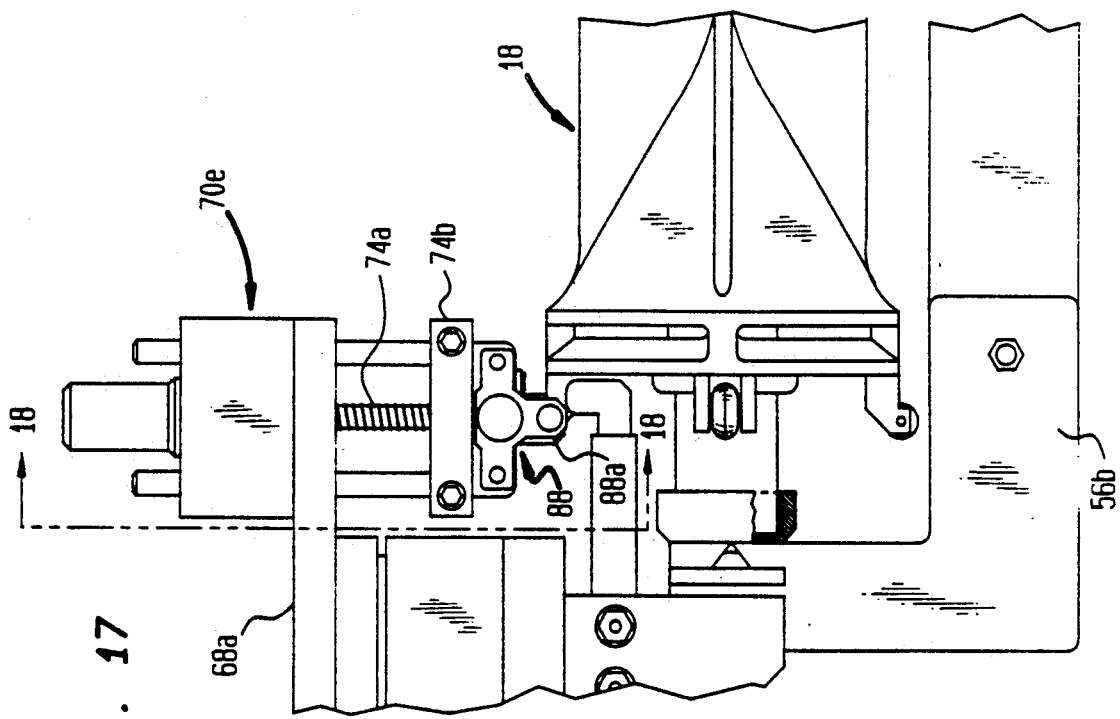
FIG. 17 is an elevation, side view of the fifth tool of FIG. 7 in position adjacent to the clevis.
Figure 19:
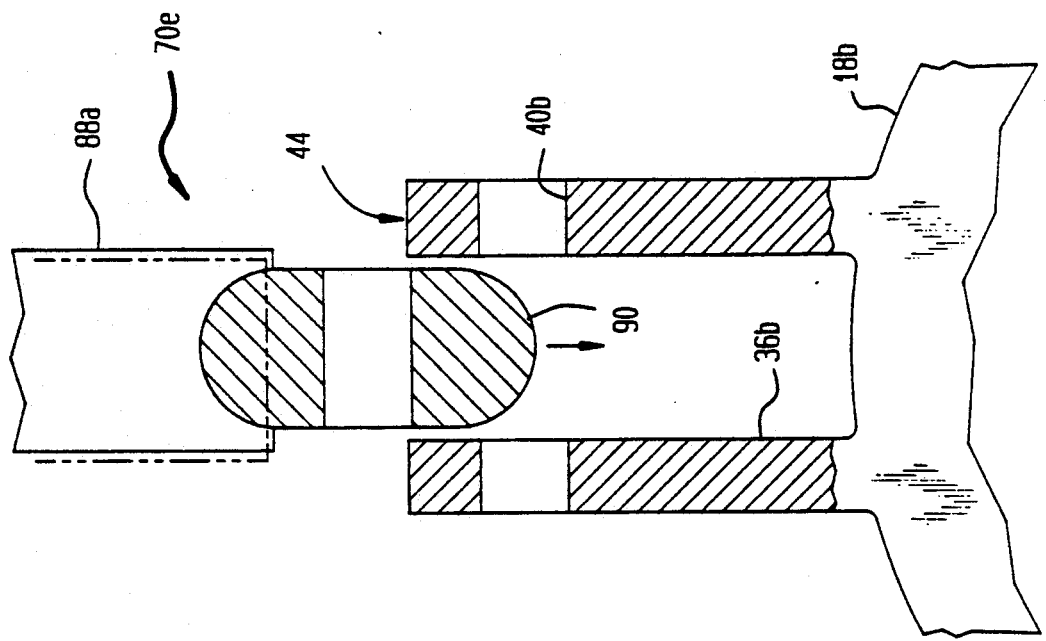
FIG. 19 is an enlarged elevational, partly sectional view of a portion of the fifth tool illustrated in FIG. 18 showing a replacement roller being inserted into the clevis.
Figure 21:
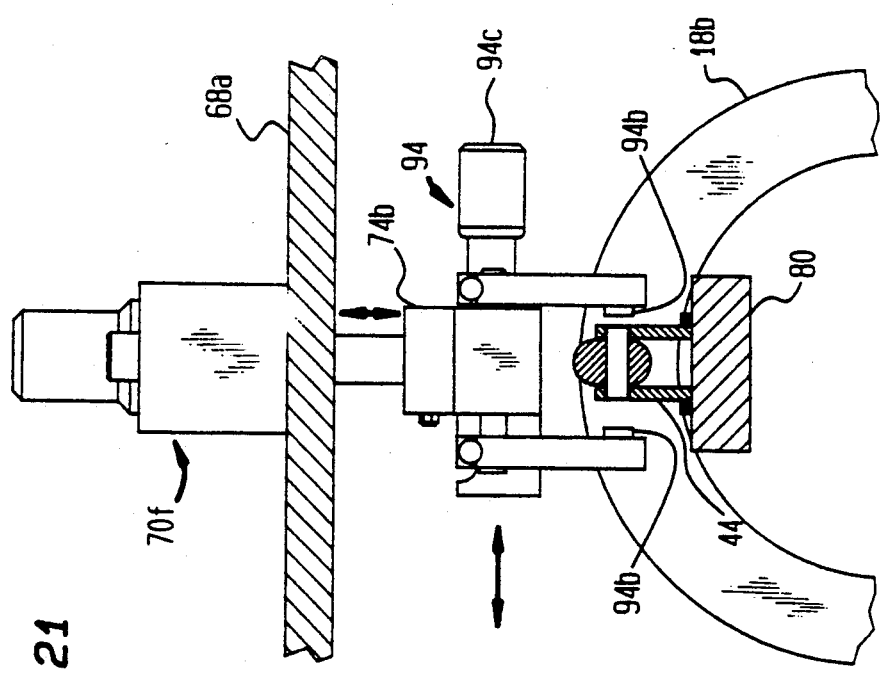
FIG. 21 is an elevational, partly sectional transverse view of the sixth tool illustrated in FIG. 7 in position adjacent to the clevis.
Figure 18:
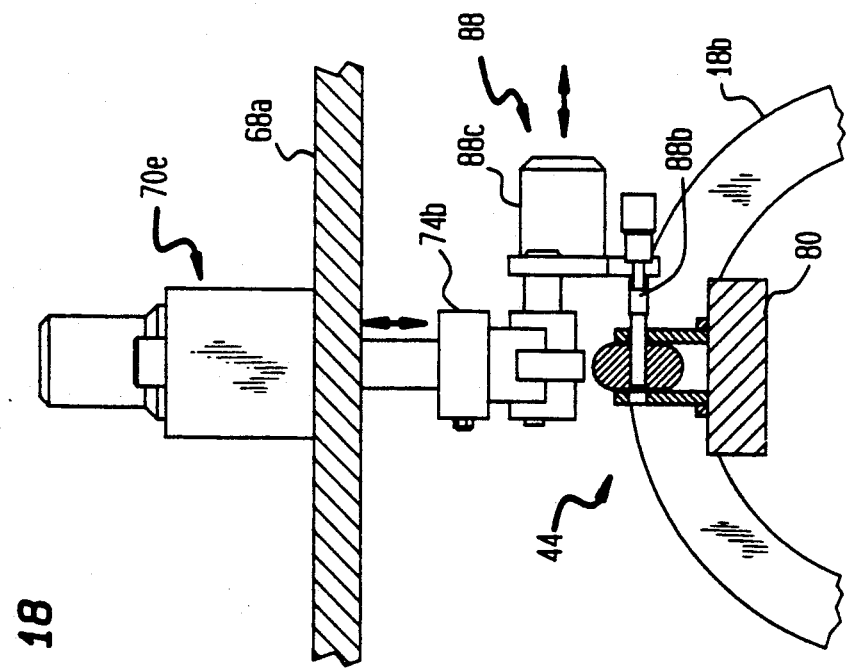
FIG. 18 is an elevational, partly sectional transverse view of the fifth tool illustrated in FIG. 17 taken along line 18—18.

The fifth tool 70e includes means 88 for inserting a non-cobalt bearing replacement roller 90 into the roller aperture 36b, as shown more clearly in FIGS. 19 and 20, and inserting a non-cobalt bearing replacement pin 92 into the reamed pin aperture 40b and through the replacement roller 90 for holding the replacement roller 90 in the roller aperture 36b. As shown in FIGS. 17 and 19, the inserting means 88 include a roller gripper 88a which may take the conventional form of prongs for inserting the replacement roller 90 into position in the roller aperture 36b in the clevis 44. A pin gripper 88b illustrated in FIGS. 18 and 20 in the form of a conventional chuck may be used to insert the replacement pin 92 through both the pin aperture 40b and the replacement roller 90. Another drive motor 88c as shown in FIG. 18 is operatively connected to the pin gripper 88b for translating the pin 92 through the clevis 44. The pin gripper 88b may be released from the pin 92 and then used itself to push the pin 92 flush with the clevis 44 as required. The inserting means 88 may then be retracted upwardly by the drive screw 74a so that the turntable 68a illustrated in FIG. 7 may again be rotated to index the sixth tool 70f adjacent to the replacement roller 90 and replacement pin 92 as illustrated in FIGS. 21 and 22.

The sixth tool 70f includes means 94 for fixedly securing the replacement pin 92 in the pin aperture 40b for securing the replacement roller 90 in the mounting aperture 36b. For example, the securing means 94 may be in the form of a conventional underwater gas tungsten arc welder or tungsten inert gas (TIG) welder including a TIG welding electrode 94a extending through a purge tube 94b. As shown in FIG. 21, two opposing electrodes and purge tubes 94a, 94b are mounted on opposite sides of the clevis 44 and operatively joined to the drive motor 94c for alternately positioning each of the electrodes 94a adjacent to a respective end of the replacement pin 92 as shown, for example, in FIG. 22. A conventional inert gas 94d is channeled through the purge tube 94b for purging the water therefrom and initially drying the end of the replacement pin 92 so that the TIG electrode 94a may effectively form a suitable weld 96, shown partly formed at the pin right end in FIG. 22, to fixedly join the replacement pin 92 to the clevis 44. One or both ends of the replacement pin 92 may be welded to the clevis 44, with both ends being weld thereto as shown in FIG. 22.

Once welding of the replacement pin 92 is completed, the welder 94 may be retracted upwardly to allow the turntable 68a to rotate and again index into position the first tool 70a. The motor 60 shown in FIG. 1 may then be used to rotate the strongback tube 52 for placing into position a second one of the radioactive rollers 32 and then the entire sequence may be repeated to remove that roller 32 for substitution by another replacement roller 90. In this way, all four of the original radioactive roller 32 disposed at the control rod bottom end 18b may be removed, and if desired, substituted with non-cobalt bearing replacement rollers 90 and replacement pins 92. If replacement rollers and pins 90, 92 are not installed, the control rod 18 may be returned to service without them, or alternate replacements (not shown) could be used instead.

Since the mounting arrangement of the rollers 32 in the clevises 44 of the control rod bottom end 18a as shown in FIG. 4 is different than the mounting arrangement of the rollers 32 at the control rod top end 18a as shown in FIG. 3, the second machine 50, although being functionally similar to the first machine 48 is specifically tailored for the different mounting geometry. More specifically, and referring to FIGS. 23 and 24, the second machine 50 is illustrated schematically in more particularity. Like the first machine 48, the second machine 50 includes a similar second carriage 64b and second turntable 68b being similarly translatable by the positioning means 66. The second turntable 68b is similarly rotatable by conventional rotating means 72b to sequentially index similar first through sixth tools 70u-70z.

Figure 23:
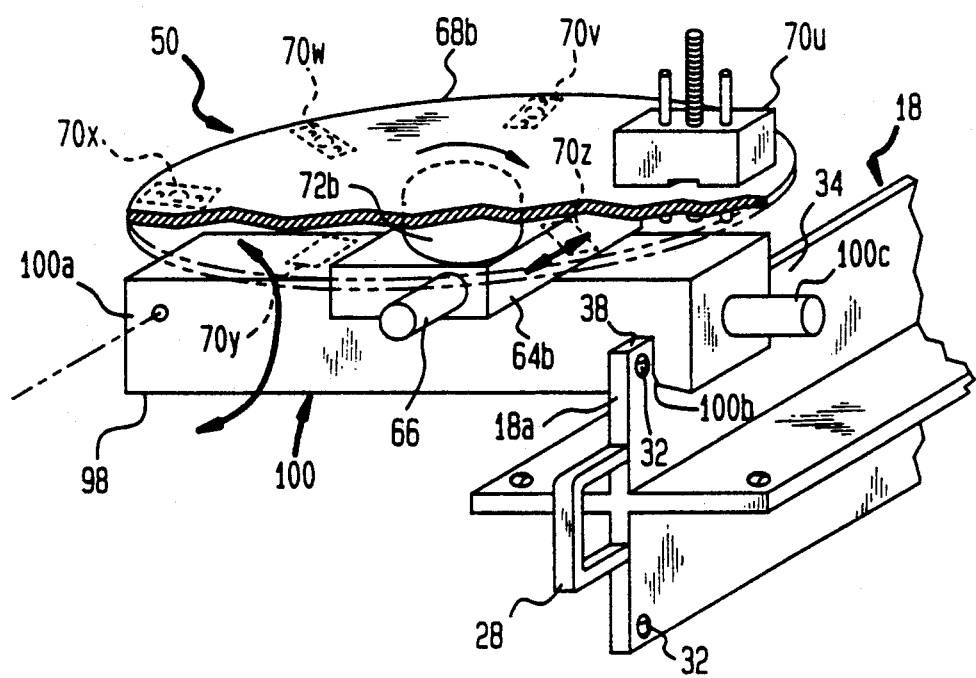
FIG. 23 is a schematic representation of a second machine for removing and replacing plate-mounted rollers and pins, and including a turntable having six tools mounted thereon.

In order to complement the cruciform configuration of the control rod top end 18a, the second machine 50 includes means 98 for rotating the second carriage 64b towards the plate edge 38 for positioning the first tool 70u adjacent to the radioactive roller 32. The rotating means 98 includes an arm 100 suitably conventionally pivoted at a proximal end 100a and having a U-shaped recess 100b at its distal end configured to fit over the plate 34 as illustrated in FIG. 23. The second carriage 64b is suitably mounted transversely to the arm 100, and the rotations of the second turntable 68b and the arm 100 are in two perpendicular planes. In this way, the arm 100 may be rotated down so that the recess 100b is positioned over the plate 34 and away from the roller 32, and the second carriage 64b may be translated parallel to the plate 34 to position the first tool 70u directly above the roller 32.

Figure 24:
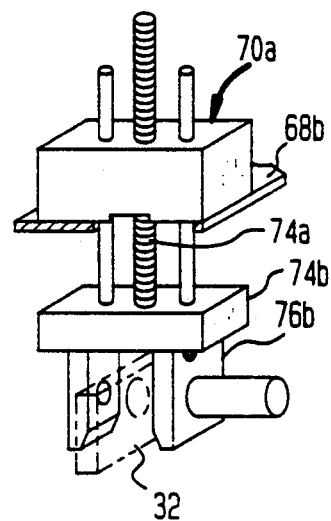
FIG. 24 is an enlarged, schematic view of the first tool illustrated in FIG. 23.

The first tool 70u is an aligner tool having means 76b in the form of a U-shaped clamp for aligning the turntable 68b relative to the radioactive roller 32. As shown in FIGS. 23 and 24, the clamp 76b is selectively lowered from the second turntable 68b into position over one of the rollers 32 and is then suitably clamped thereto for holding its position. A conventional actuator 100c at the distal end of the arm 100 is then activated to clamp the plate 34 within the recess 100b for holding the control rod 18 in position for all subsequent operations, and then the clamp 76b is released and retracted upwardly by the first tool 70u. Once the radioactive roller 32 is properly aligned relative to the second turntable 68b by this step, the second turntable 68b may be rotated to index into position the second tool 70v as shown schematically in FIG. 25.

The freeing means 82 of the second tool 70v like the second tool 70b disclosed above include a conventional electrical discharge machine (EDM) having a special, tubular electrode 102 effective for cutting the plate 34 for freeing the radioactive pin 42 from the edge 38 while providing a head 104, shown in dashed line in FIG. 25, on the pin 42 which is formed by a portion of the plate 34 at the weld 46.

Figure 26:
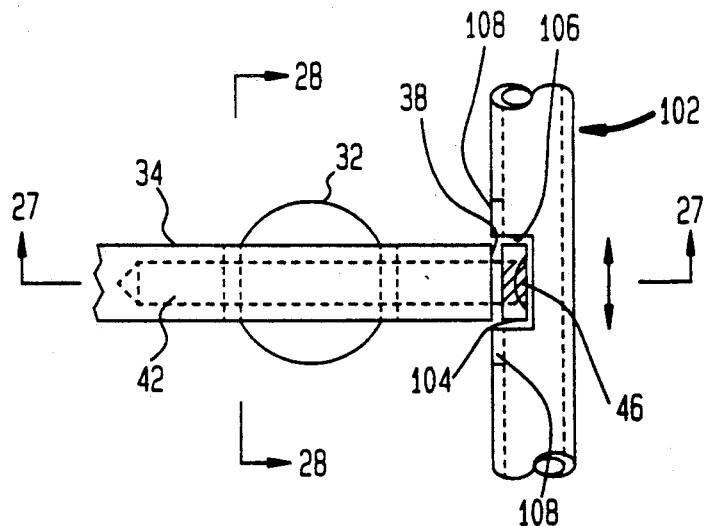
FIG. 26 is a top view of the plate-mounted roller illustrated in FIG. 23 and an electrode of the second tool disposed adjacent thereto.
Figure 27:
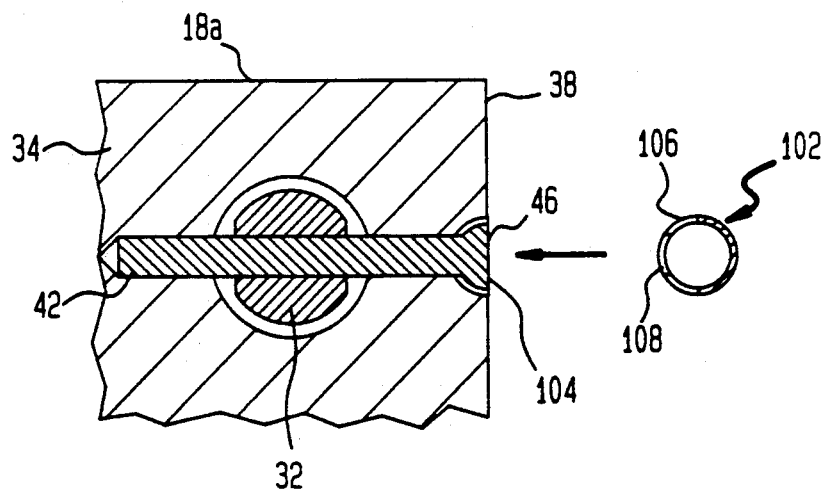
FIG. 27 is an elevational, sectional view of the plate-mounted roller illustrated in FIG. 26 taken along line 27—27.
Figure 28:
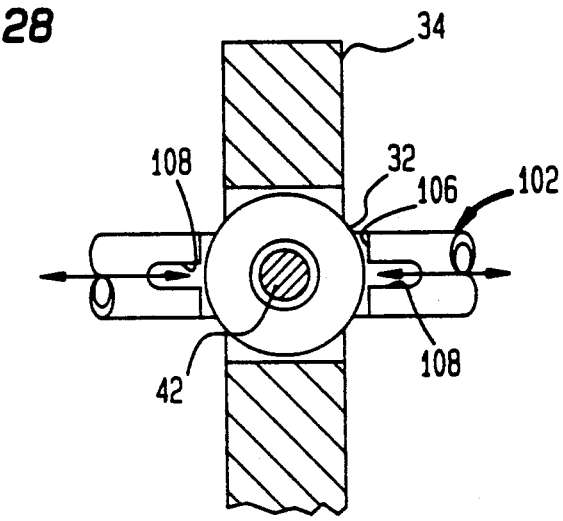
FIG. 28 is an elevational, partly sectional view of the plate-mounted roller illustrated in FIG. 26 taken along line 28—28.

More specifically, and referring to FIGS. 26-28, the electrode 102 is shown as preferably including a first generally U-shaped slot 106 specifically configured for alternately eroding away the plate 34 on both sides adjacent to the weld 46 for freeing the radioactive pin 42 while forming the head 104. As shown in FIG. 26, the first slot 106 initially straddles the plate 34 at the welded end of the pin 42 adjacent the edge 38 and is then translated alternately toward each side of the plate 34. Since the first slot 106 is formed in a tubular electrode 102, the resulting EDM slot formed in both sides of the plate 34 is generally cresent-shaped. The electrode 102 further includes a pair of opposing second slots 108 having a width on the order of the diameter of the pin 42 so that as the electrode 102 removes material from each side of the plate 34, the pin 42 will not be severed, and the resulting head 104 remains with the pin 42 after the EDM process is finished. In this way, the radioactive pin 42 may be freed from the plate 34, with the weld 46 remaining as part of the head 104.

Figure 30:
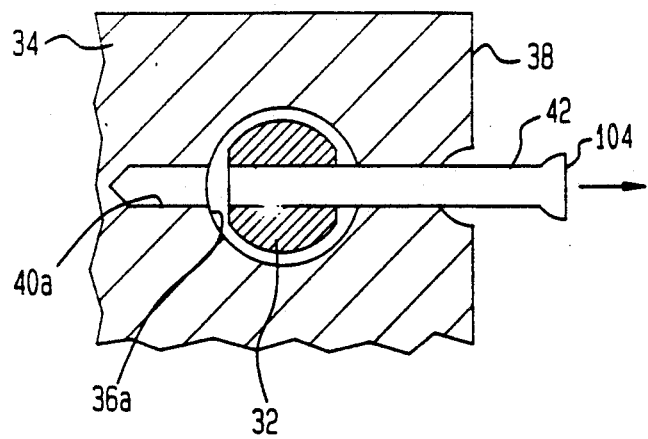
FIG. 30 is an elevational, partly sectional view of the plate mounted roller illustrated in FIG. 29 showing removal of the pin.

Shown schematically in FIGS. 29 and 30 is the third tool 70w which includes conventional means in the form of a clamp or grippers 110 which are effective for gripping the head 104 of the radioactive pin 42 and pulling the pin 42 from the pin aperture 40a to remove the radioactive roller 32. Once the pin 42 is removed, the roller 32 may be suitably captured in a receptacle (not shown) and removed from the vicinity for proper disposal thereof.

Figure 32:
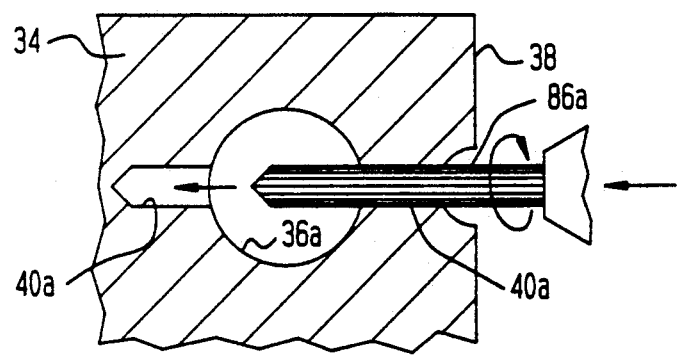
FIG. 32 is an enlarged, partly sectional view of the control rod plate illustrated in FIG. 31 adjacent to the fourth tool.
Figure 34:
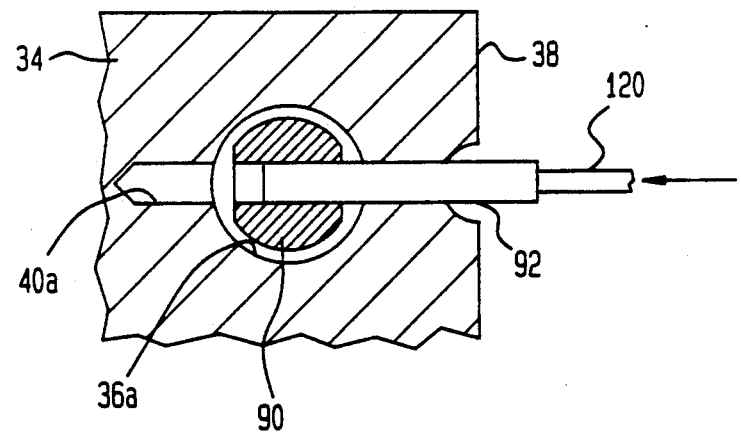
FIG. 34 is an enlarged, partly sectional view of the control rod plate illustrated in FIG. 33 adjacent to the fifth tool.

The third tool 70w may then be retracted away, and then the second turntable 68b rotated to index into position the fourth tool 70x as illustrated in FIGS. 31 and 32. The fourth tool 70x includes a conventional reamer 86a suitably rotated by the conventional drive motor 86b to conventionally ream the pin aperture 40a as required. The reamer 86a is then suitably retracted away with the fourth tool 70x, and again the second turntable 68b is rotated to index into position the fifth tool 70y illustrated schematically in FIGS. 33 and 34.

Figure 33:
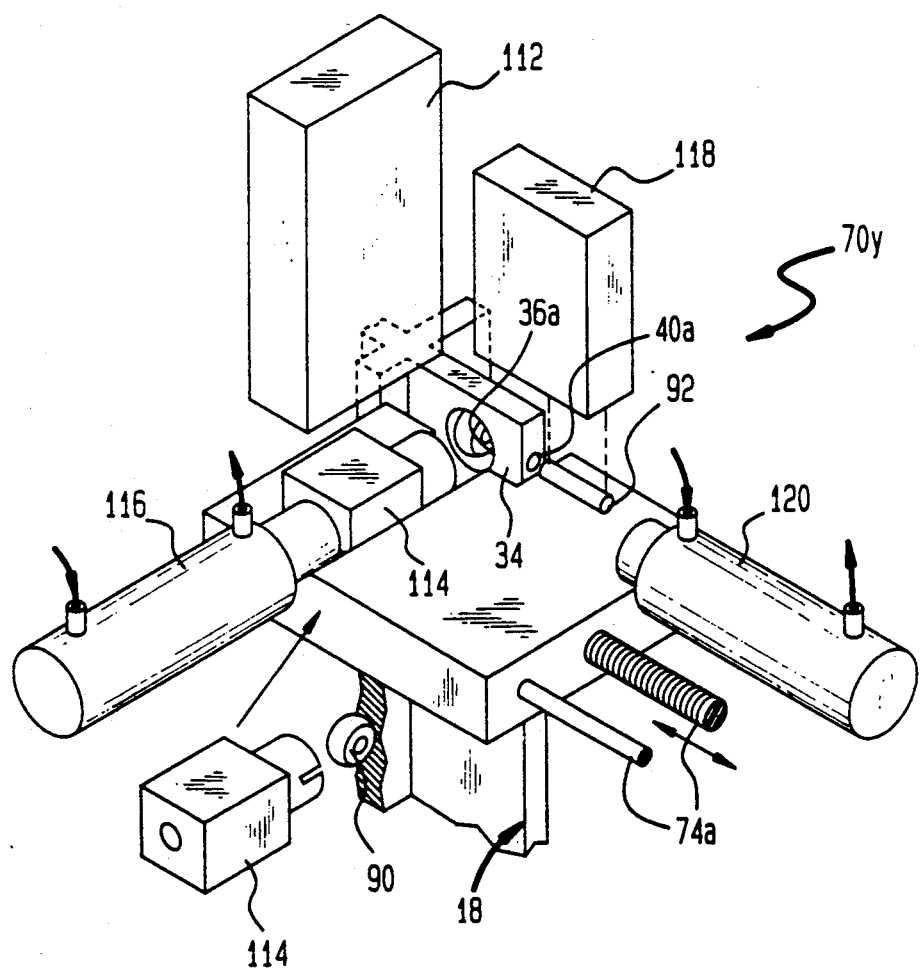
FIG. 33 is a schematic, partly exploded representation of the fifth tool joined to the turntable illustrated in FIG. 23 adjacent to the control rod plate.

In FIG. 33, a roller magazine 112 contains a plurality of roller carriers 114 each containing a replacement roller 90. A conventional pneumatic ram 116 is used to eject the roller 90 from the carrier 114 and into position within the roller aperture 36a. A pin magazine 118 includes a plurality of the replacement pins 92 which are sequentially ejected into position adjacent by a second pneumatic ram 120 which inserts the pin 92 through the pin aperture 40a and through the replacement roller 90 into a fully inserted position. The fifth tool 70y is then suitably withdrawn upwardly toward the second turntable 68b, and then the second turntable 68b is again rotated to index into position the sixth tool 70z as illustrated in FIGS. 35 and 36.

Figure 36:
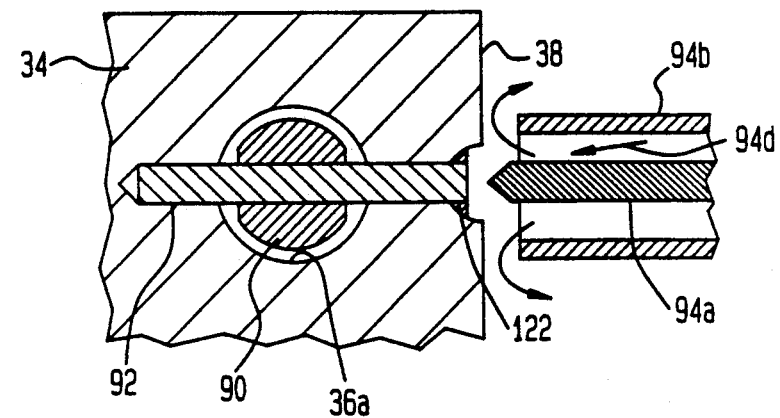
FIG. 36 is an enlarged, partly sectional view of the control rod plate adjacent to the sixth tool illustrated in FIG. 35.

The sixth tool 70z of the second machine 50 is similar to the sixth tool 70f of the first machine 48 illustrated in FIG. 22 except for its orientation extending perpendicularly upwardly from the plate edge 38 and that it includes a single electrode 94a and single purge tube 94b since only one end of the replacement pin 92 is available for welding as shown at the weld 122 illustrated in FIG. 36. Again, the inert gas 94d is firstly channeled through the purge tube 94b to purge the water away from the end of the replacement pin 92, and then the end is conventionally TIG welded to the plate 34 in the cresent-shaped recess remaining in the plate edge 38. The replacement pin 92 is, therefore, similarly welded to the plate edge 38 as in the original design, for securely mounting the replacement roller 90 within the roller aperture 36a.

The sixth tool 70z is then retracted upwardly toward the second turntable 68b and the first tool 70u is again brought into position. The actuator 100c illustrated in FIG. 23 is then released for releasing the clamping action of the arm 100, and then the arm 100 is rotated away from the control rod 18. The strongback tube 52 illustrated in FIG. 1 is then rotated by the motor 60 for placing into position a successive one of the radioactive rollers 32, and then the entire sequence is repeated for replacing the radioactive roller 32 and pin 40 with the non-cobalt bearing replacement roller 90 and pin 92.

The two machines 48 and 50 illustrated in FIG. 1, are therefore effective for removing the radioactive rollers 32 and pins 42 from the control rod 18 at all times underwater which provides additional protection against the radiation being emitted therefrom. The removal of the radioactive rollers and pins may be done remotely by the machines 48 and 50 so that operators are not subjected to radiation. The control rods 18 may be returned to operation within the reactor core 16 without the radioactive rollers and pins, if desired, or replacement rollers and pins 90, 92 may be inserted by the machines 48 and 50 if desired. In this way, the original control rods 18 may be returned to use in the reactor core 16 for the remainder of their useful lives without further concern for the removed cobalt-bearing rollers and pins 32, 42.

While there have been described herein what are considered to be preferred embodiments of the present invention, other modifications of the invention shall be apparent to those skilled in the art from the teachings herein, and it is therefore, desired to be secured in the appended claims all such modifications as fall within the true spirit and scope of the invention.

We claim:

1. An apparatus for servicing an irradiated nuclear control rod underwater in a reactor building servicing pool comprising:
   a carriage;
   a turntable rotatably joined to said carriage and including a plurality of spaced apart tools supported thereon;
   means for positioning said carriage adjacent to said control rod;
   means for rotating said turntable to index a first one of said tools adjacent to a radioactive roller mounted in a roller aperture in said control rod by a radioactive mounting pin extending through a pin aperture in said control rod and through said roller;
   said first tool including means for aligning said turntable relative to said radioactive roller;
   said rotating means being effective for indexing a second one of said tools adjacent to said radioactive roller and pin, said second tool including means for freeing said radioactive pin from said control rod; and
   said rotating means being effective for indexing a third one of said tools adjacent to said radioactive roller and pin, said third tool including means for removing said radioactive pin and said radioactive roller from said control rod.

2. An apparatus according to claim 1 further comprising:
   said rotating means being effective for indexing a fourth one of said tools adjacent to said pin aperture; and
   said fourth tool including means for reaming said pin aperture.

3. An apparatus according to claim 2 wherein:
   said rotating means is effective for indexing a fifth one of said tools adjacent to said roller aperture;
   said fifth tool includes means for inserting a replacement roller into said roller aperture and a replacement pin into said pin aperture and through said replacement roller for holding said replacement roller in said roller aperture;
   said rotating means is effective for indexing a sixth one of said tools adjacent to said replacement roller and replacement pin; and
   said sixth tool includes means for fixedly securing said replacement pin in said pin aperture for securing said replacement roller in said mounting aperture.

4. An apparatus according to claim 3 wherein said control rod includes a clevis having a pair of spaced apart legs defining said roller aperture for receiving said radioactive roller, and said pin aperture extends through both said legs for receiving said radioactive pin to secure said radioactive roller in said clevis.

5. An apparatus according to claim 4 further comprising means for translating said carriage toward said clevis for positioning said first tool adjacent to said radioactive roller.

6. An apparatus according to claim 5 wherein:
   said radioactive pin is joined to at least one of said legs by a weld; and
   said freeing means of said second tool are effective for separating said weld for freeing said radioactive pin from said clevis.

7. An apparatus according to claim 6 wherein said freeing means comprise an electric discharge machine having at least one electrode positionable adjacent to said weld for eroding away said weld to free said radioactive pin.

8. An apparatus according to claim 6 wherein said removing means of said third tool include a ram pin translatable against one end of said radioactive pin to push said radioactive pin through said pin and roller apertures for removal from said clevis.

9. An apparatus according to claim 6 wherein said securing means of said sixth tool include a welding electrode extending through a purge tube, said electrode and said purge tube being positionable adjacent to an end of said replacement pin with an inert gas being channeled through said purge tube as said electrode welds said replacement pin end to said clevis.

10. An apparatus according to claim 3 wherein said control rod includes a plate having said roller aperture extending therethrough adjacent to an edge, and said pin aperture extends through said plate inwardly from said edge and through said roller aperture.

11. An apparatus according to claim 10 further comprising means for rotating said carriage toward said plate edge for positioning said first tool adjacent to said radioactive roller.

12. An apparatus according to claim 11 wherein:
   said radioactive pin is joined to said plate edge by a weld; and
   said freeing means of said second tool are effective for cutting said plate for freeing said radioactive pin from said edge while providing a head on said radioactive pin formed of a portion of said plate at said weld.

13. An apparatus according to claim 12 wherein said freeing means comprise an electrical discharge machine having a tubular electrode, said electrode including a slot configured for alternately eroding away said plate on both sides adjacent to said weld for freeing said radioactive pin while forming said head.

14. An apparatus according to claim 13 wherein said removing means of said third tool are effective for gripping said head and pulling said radioactive pin from said pin aperture to remove said radioactive roller.

15. An apparatus according to claim 14 wherein said securing means of said sixth tool include a welding electrode extending through a purge tube, said electrode and purge tube being positionable adjacent to an end of said replacement pin with an inert gas being channeled through said purge tube as said electrode welds said replacement pin end to said plate edge.

16. A method for servicing an irradiated nuclear control rod underwater in a reactor building servicing pool comprising the steps of:

positioning adjacent to said control rod a carriage containing a plurality of tools supported on a turntable;

rotating said turntable to index a first one of said tools adjacent to a radioactive roller mounted in a roller aperture in said control rod by a radioactive mounting pin extending through a pin aperture in said control rod and through said roller;

aligning said turntable relative to said radioactive roller using said first tool;

rotating said turntable to index a second one of said tools adjacent to said radioactive roller and pin;

freeing said radioactive pin from said control rod using said second tool;

rotating said turntable to index a third one of said tools adjacent to said radioactive roller and pin; and removing said radioactive roller and pin from said control rod using said third tool.

17. A method according to claim 16 further comprising:

rotating said turntable to index a fourth one of said tools adjacent to said pin aperture; and reaming said pin aperture using said fourth tool.

18. A method according to claim 17 further comprising:

rotating said turntable to index a fifth one of said tools adjacent to said roller aperture;

inserting a replacement roller into said roller aperture, and a replacement pin into said pin aperture and through said replacement roller for holding said replacement roller in said roller aperture;

rotating said turntable to index a sixth one of said tool adjacent to said replacement roller and replacement pin; and fixedly securing said replacement pin in said pin aperture for securing said replacement roller in said roller aperture.

* * * * *